United States Patent [19]

Crawford

[11] 4,060,219
[45] Nov. 29, 1977

[54] QUICK DISCONNECT COUPLER AND SAFETY CHECK VALVE

[76] Inventor: Charles S. Crawford, 405 S. LaJolla Ave., Tucson, Ariz. 85711

[21] Appl. No.: 583,573

[22] Filed: June 4, 1975

[51] Int. Cl.² .................. F16L 29/00; F16L 37/28
[52] U.S. Cl. .................. 251/149.6; 285/316; 137/614.05
[58] Field of Search .................. 137/614.03, 614.04, 137/614.05, 614.06; 251/149.6; 285/277, 316, DIG. 25

[56] References Cited

U.S. PATENT DOCUMENTS

| | | | |
|---|---|---|---|
| 2,069,377 | 2/1937 | Matthiessen, Jr. | 285/277 |
| 2,433,119 | 12/1947 | Hansen | 251/149.6 X |
| 2,860,893 | 11/1958 | Clark | 285/316 X |
| 2,905,485 | 9/1959 | Zajac | 251/149.6 |
| 3,188,123 | 6/1965 | Hansen | 285/277 |
| 3,567,175 | 3/1971 | Sciuto, Jr. | 251/149.6 |
| 3,826,523 | 7/1974 | Eschbaugh | 285/DIG. 25 |

FOREIGN PATENT DOCUMENTS 209,648 11/1959 Austria .................. 251/149.6

*Primary Examiner*—William R. Cline
*Attorney, Agent, or Firm*—J. Michael McClanahan

[57] ABSTRACT

A quick disconnect coupler with air safety check valve for placement in a compressed air system to receive an associated male plug on the end of a flexible hose connected to an associated air tool, said quick disconnect coupler providing means to hold the plug in a wedging configuration such that attempted withdrawal tightens the coupler's hold on the plug, and an air safety check valve that automatically cuts off the flow of compressed air through the valve when a certain air flow is exceeded, such as in the event that the air line connected to the plug is severed. Additionally, during removal of the plug from the inventive coupler, holding pins in the coupler retain the plug in order that compressed air in the flexible hose may be bled off before the plug is removed and additionally the coupler provides full flow air valves which air passageway exceed the size of the air passageway of a receiving male plug.

10 Claims, 12 Drawing Figures

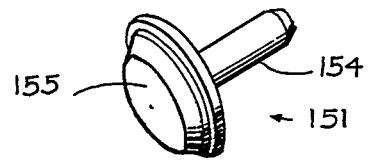
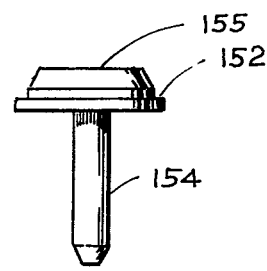
FIG. 2   FIG. 2A
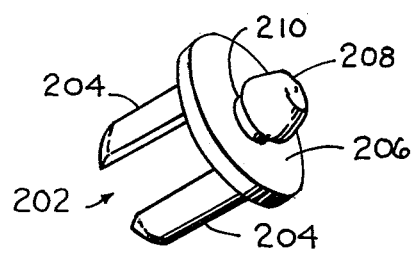
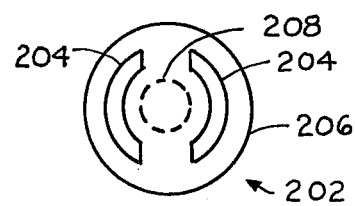
FIG. 3   FIG. 3A
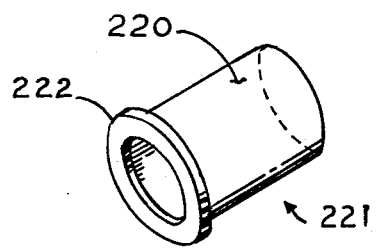
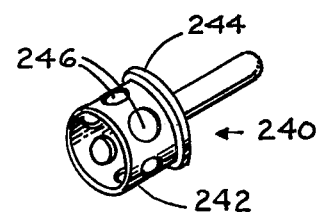
FIG. 4   FIG. 5

QUICK DISCONNECT COUPLER AND SAFETY CHECK VALVE

BACKGROUND OF THE INVENTION

Quick disconnect type couplers and safety valves are old in the art, there having existing needs for means of connecting tools utilizing compressed air with the compressed air source, especially where flexible hose coupling between the compressed air source and the air tool is necessary. The present couplers available suffer from shortcomings such that when the male plug is disengaged from the coupler, the compressed air held in the air tool and in the flexible hose leading from the plug to the air tool causes the plug to shoot out of the coupler and thus be potentially harmful. Further, the present couplers fail to hold the male plug when force is exerted upon the plug pulling it out of its connection with the coupler. Similarly, safety check valves now in the public sector are clumsy two piece devices which do not provide flexibility to adapt into compressed air systems and which require extensive maintenance work.

SUMMARY OF THE INVENTION

The present invention comprises a quick disconnect coupler and safety check valve for insertion in compressed air systems wherein means are provided in the invention to hold an associated male plug in a manner such that the plug is securely held and, if an attempt is made to withdraw the plug by pulling the plug out, the hold upon the plug by the inventive coupler tends to tighten by wedging a steel ball into a smaller and smaller area. Additionally, safety release pins interior to the coupler permit, upon authorized removal of the male plug from the coupler, the compressed air in the air line to be released before the plug is withdrawn. Further, the invention provides a full flow air valve which checks the flow of air as such that the area of the air flow through the valve is greater than the standard male plug flow area so that the cut-off check valve does not in any way impede the flow of air through the invention. Additionally, the invention provides means whereby air flow is cut off whenever the air flow through the invention exceeds a specified amount which would occur in times such as when the air line were severed. This specified air flow may be set when constructing the invention.

Accordingly, it is an object of the present invention to provide a quick disconnect coupler and safety check valve which holds an associated male plug in a configuration where unauthorized attempts to withdraw the male plug results in increased holding of the plug.

It is also an object of the present invention to provide a means to permit the compressed air held in the air line to be bled off before the male plug attached to the air line is withdrawn from the coupler.

It is a further object of the present invention to provide a means where the air cut-off check valve does not impede the flow of air through the invention, but in fact, provides a greater area for air flow than the receiving plug and air line.

It is still further an additional object of the present invention to provide a safety means to stop the flow of compressed air through the invention whenever a predetermined air flow is exceeded, such as in the case of a severed air line.

BRIEF DESCRIPTION OF DRAWINGS

FIG. 2 is a perspective view of the holding pin.
FIG. 2A is a side view of the holding pin.
FIG. 3 is a perspective view of the air valve.
FIG. 3A is a bottom view of the air valve.
FIG. 4 is a perspective view of the spring shell.
FIG. 5 is a perspective view of the clapper.

DETAILED DESCRIPTION

Figure 1:
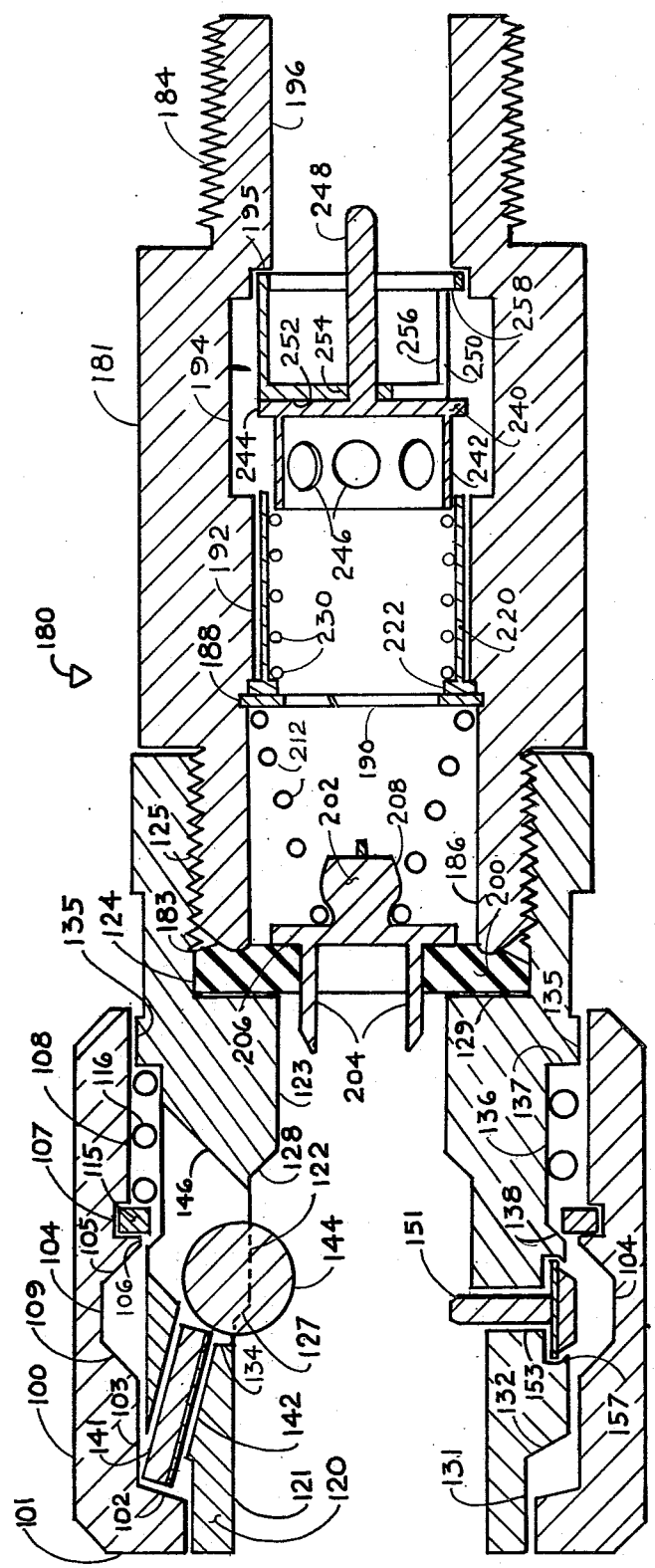
FIG. 1 is a cut-away side view of the inventive quick-disconnect coupler and safety check valve.

FIG. 1 is a cutaway drawing of the inventive quick disconnect coupler device for connection between a source of compressed air and the flexible air line hose leading to an air operated tool showing the invention with all its components in a quiescent state, i.e., when it is not attached to an air line or air tool. Proceeding from left to right, i.e., from the portion of the quick disconnect coupler that connects to an air line, outside, sleeve 100 encompasses main body 120. Main body 120 comprising a metal hollow cylinder having an opening at one end larger than the other, the largest end opening for insertion of the male plug (not shown) which is operably attached to an air line which is, in turn, connected to an air operated tool. The exterior cylindrical surface of sleeve 100 may be knurled for ease of handling and each of the circular end corners may be champered or rounded for appearance and handling as shown in FIG. 1.

Located at the left-most portion of the sleeve 100 is annular sleeve lip 101 which extends to, and slides over, the outer cylindrical smooth surface 131 of main body 120. Continuing left to right on the cross section of the annular sleeve 100 shown in FIG. 1 is annular washer-like surface 102 which contributes to form the inner part of sleeve lip 101, surface 102 being normally about eight degrees from the vertical direction, i.e., a line drawn normal to the cylindrical axis of sleeve 100. Thereafter, smooth cylindrical interior surface 103 of sleeve 100 joins surface 102, smooth surface 103 being about one-fourth of the total length of sleeve 100. Smooth cylindrical interior surface 103 is adapted to slide upon the smooth external cylindrical surface 133 of main body 100. Joining smooth surface 103 is annular groove 104 cut into sleeve 100, annular groove 104 being defined by a 45 degree angle wall 109 in its forward section and a 45 degree sloping wall 105 in the back section. Annular groove 104, in its bottom portion, is also about one-fourth of the total length of sleeve 100. Moving to the rear portion of sleeve 100, sloping wall 105 terminates into the very short smooth cylindrical interior surface 106 which, in turn, provides a wall section for annular groove 107 cut into the interior portion of sleeve 100 immediately to the right of sloping wall 105. Annular groove 107 is adapted to receive snap ring 115. The rear wall portion of annular groove 107 rises to meet smooth cylindrical surface 108 which has a two-fold purpose, namely to contain compression spring 116 and to ride over the smooth external cylindrical alignment surface 135 of main body 120.

As can be seen from FIG. 1, the relative diameters of the sleeve 100 internal cylindrical surfaces comprises sleeve lip 101 which has the smallest diameter, the interior of sleeve 100 then rising by means of surface 102 to the next smallest interior surface 103 and finally rising to the greatest interior diameter, annular groove 104. Thereafter, the interior diameter of sleeve 101 narrows to annular surface 106 which is about the same diameter as cylindrical surface 103. Annular groove 107 then yields to interior cylindrical surface 108 which has a slightly greater diameter than smooth surface 103 and 106. This completes the physical description of sleeve 100 although its working relationship with main body 120 is discussed infra.

Proceeding now to describe main body 120 as shown in FIG. 1, the forward or left hand portion of the main body 120 has the smooth entrance cylindrical interior surface 121 adapted to permit entrance of the male plug (not shown) connected to a flexible air hose. Smooth surface 121 continues for about one-third the total length of main body 120 (a distance of about one-half the length of encompassing sleeve 100) and then narrows by means of sloping wall 127 (shown dotted) to smooth cylindrical interior surface 122. Smooth surface 122 then narrows by means of sloping wall 128 to the narrowest diameter section of main body 120, smooth cylindrical interior surface 123. Smooth cylindrical surface 122 also comprises approximately one-third of the total length of main body. Sloping walls 127 and 128 are nominally at 45° with the cylindrical axis of main body 120.

Figure 9:
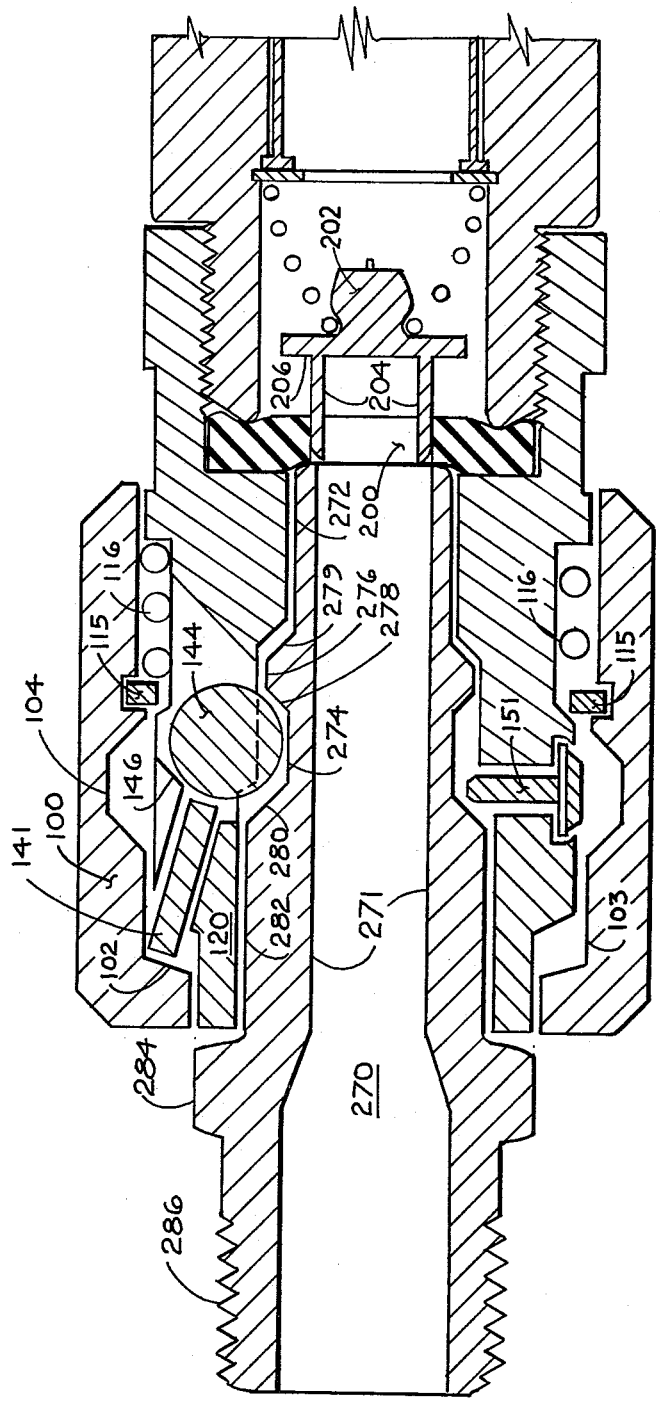
FIG. 9 is a partial cut-away side view of the invention with the male plug inserted therein.

Smooth interior surface 123 continues through main body 120 a short distance, about the same length as surface 122 and then is abruptly terminated by a wall 129 perpendicular to surface 123. Wall 129 itself terminates into the largest diameter interior surface 124, which surface is threaded for about five-sixths of its length, threads 125 extending from the exterior end of main body 120, a distance of approximately one-third the length of main body. The lengths of interior surfaces of main body 120 are determined by their relationship to the male plug with which they must co-act. The male plug which is commonly used is one that is standard in the industry and comes in various sizes, for example, see MIL-C-4109D; Feb. 23, 1967. FIG. 9 illustrates the relational lengths of main body 120 interior surfaces with the male plug inserted.

Referring still to FIG. 1, the external cylindrical surfaces of main body 120 comprise smooth cylindrical surface 131 which slides inside sleeve lip 101 of sleeve 100 which, continuing from the left to the right, is terminated by sloping wall 132, which rises to flat cylindrical surface 133. Surface 133 slides upon a portion of sleeve surface 103 when sleeve 100 is drawn to the rear. Cylindrical surface 133 extends about one-quarter the total length of main body 120 and is terminated at its rear-most portion by sloping wall 138 which joins cylindrical surface 136. Surface 136 continues to the rear where it is terminated by right angle wall 137 which rises to meet smooth cylindrical alignment surface 135. Thereafter, the external surface of mainbbody 120 continues to the rear where the only requirement is that it not present an obstruction to sleeve 100 when sleeve 100 is drawn to the rear. Nominally, the continuing surface is smooth and round, although flat surfaces may be formed therein for the purpose of applying a wrench when tightning the screw relationship with the safety check valve 180 discussed infra.

Certain mechanical parts and features work in on conjunction with main body 120 and sleeve 100 during the operation and use of the quick disconnect coupler herein described. These features and elements comprise release pin 141 which slides within passage way 142 to engage clamping ball 144. As can be seen from FIG. 1, angular washer-like surface 102, as sleeve 100 is pulled to the rear, strikes release pin 141 which in turn pushes on clamping ball 144 and causes it to rise in passageway 146. Passageway 142 is slanted at an 8° slope relative to the horizontal axis of main body 120, and release pin 141 is cylindrical with square end, which permits surface 102 to strike flatly the end of pin 141. It is also noted that the end of release pin 141 engages clamping ball 144 at a point which is slightly above the center of clamping ball 144 (if an imaginary line were continued into clamping ball 144 from the striking point). As can be seen in FIG. 1, when sleeve 100 is drawn to the rear, release pin 141 pushes on clamping ball 144 causing clamping ball 144 to rise in passageway 146. The end of release pin 141 is a circular flat surface, perpendicular to the axis of the pin. At all times, even when clamping ball 144 is in its highest most position, only the flat face of release pin 141 engages the surface of ball 144. The ball never rides over the edge of the pin. While release pin 141 does initially strike clamping ball 144 at a point above ball 144'c center, it is not so high above the center that it would force ball 144 down, but in fact the component of force in the direction of the axis of main body 120 is substantially greater than that which would be forcing ball 144 downward towards the center of main body 120. Passageway 146 is drilled at a 37° angle with respect to the cylindrical axis of main body 120. When passageway 146 is drilled into main body 120 during the construction of main body 120, the drill is not permitted to penetrate completely through the wall of main body 120, but only the point of the drill may go through. As may be seen from FIG. 1, the illustration of passageway 146 upper limit shows the penetration limit of the drill. Shown in FIG. 1 is wall 134 formed by the drill shank and tip. If one were to view passageway 146 from the interior of main body 120, it would appear egg shaped, the major axis in the direction of the axis of main body 120 and the minor axis perpendicular to that. The minor axis is not sufficiently wide enough to permit clamping ball 144 to drop into main body 120; thus clamping ball 144 is illustrated in its lowest position. Normally, there are up to three clamping balls 144, their associated passageways 146, release pins 141, and passageways 142 in main body 120, all equally spaced around the circumference of main body 120. There is not, however, a limit to the number of clamping balls assemblies that may be placed upon main body 120.

Additionally shown in FIG. 1 is holding pin 151 which is shaped like the letter "T". Holding pin 151 is free within passageway 153, which is drilled through main body 120 perpendicular to its longitudinal axis. Holding pin 151 is free to move vertically within passageway 153 limited only by holding pin 151's head 155 in direction towards the center of main body 120 and the surface of main body 120 which has been rolled over (staked) at the edge of the pin receiving hole. The cleat formed is shown at 157. Normally, there are three holding pins in main body 120, equally spaced around its circumference, usually placed between clamping ball 144's position. However, as noted, there are no limits to the amount of holding pins that may be placed in holding body 120. The function of clamping ball 144 and holding pin 151 are discussed later where the inventive quick disconnect coupler is discussed in its application holding the male plug of an air line.

Resting between main body 120 cylindrical surface 136 and sleeve 100 interior cylindrical surface 108 is compression spring 116 which has as its limit snap ring 115 and wall 137 of main body 120. Compression spring 116 continuously urges sleeve 100 to its further-most position where snap ring 115 rests against sloping wall 138 of main body 120. Compression spring 116 also provides resistance to sleeve 100 being drawn to the rear and when do so and released, pushes sleeve 100 back to its normal position.

Moving to the remaining portion of the invention shown in FIG. 1, the safety check valve comprises valve body 180 having, from left to right, threaded shank 182 which threads into main body 120 posterior portion mating with threads 125. It is noted that the end portion of threaded shank 182 has an extended cylindrical ridge 183 at the end of main body 180 which slopes back to the outside of the threaded shank 182. The exterior portion of valve body 180 comprises a hexagon shaped cylindrical surface 181 and at the rear portion of valve body 180, the surface drops off to a narrower threaded portion 184. Interiorly safety valve body 180 is hollow having in the left most portion a smooth cylindrical interior surface 186 which extends approximately one-fourth the length of valve body 180. At the rear portion of surface 186 is cut annular groove 188 adapted to receive snap ring 190. Snap ring 190 is inserted during assembly of the inventive connector as later described.

Thereafter, the hollow interior of body 180 narrows abruptly to slightly smaller smooth cylindrical interior surface 192 which extends longitudinally into body 180 for about one-fourth of its length. Thereafter, the interior portion of valve body 180 enlarges to its largest interior smooth cylindrical surface 194 which continues for almost one-fourth the length of body 180. At the rear most portion of interior surface 194, an annular notch 195 has been cut into the side wall defining the cylindrical interior surface 194 to receive valve guide 258 discussed later. Thereafter, the interior of body 180 narrows to the last remaining cylindrical interior surface 196 which exits valve body 180. Valve body 180 is completely hollow in shape having the above-described interior surfaces running there through.

Retracing our steps to the left-hand portion of safety valve body 180, the elements which are interior to body 180 are as follows. First of all, rubber washer 200 is positioned between the interior diameter surface 124 of main body 120 and the end section, i.e., threaded shank 182 of valve body 180 and washer 200 is firmly held in place by screwing valve body 180 threaded shank 182 into threads 125 of main body 120. Rubber washer 200 has a centrally located opening there through in which air valve 202 has at least two prongs protruding through washer 200 opening. The ridge 183 which was formed on threaded shank 182 pushes into rubber washer 200 in order to grasp rubber washer 200 at the point nearest its central opening to prevent the washer from shrinking towards its central opening as it is deformed by the male plug which is inserted into main body 120 cavity as shown later. Air valve 202 comprises a flat circular surface 206 which covers washer 200 opening, prongs 204 attached to surface 206 and on the opposite side of surface 206, mound 208 whose primary function is to provide groove means 210 which valve spring 212 engages.

Valve spring 212, which has one end pressing against air valve 202, has the other end pressing against snap ring 190. In this way, spring 212 forces air valve 202 against rubber washer 200 and thus closes the opening through washer 200 and cuts off passage of air through the valve, air normally flowing in the direction from right to left, i.e., through the safety valve 180 to the main body 120 and thereafter to the connecting air line. In use, the air line male plug (not shown in FIG. 1, but shown in FIG. 9) which plugs into main body 120 extends into main body 120 cavity to the back portion and engages prongs 204 pushing air valve surface 206 from rubber washer 200 permitting air to pass around the flat circular surface 206, through the opening in rubber washer 200, and into the male plug occupying the cavity of main body 120.

Snap ring 190, in addition to providing a stop for valve spring 212, holds spring shell 220 in place in the hollow of smooth cylindrical interior surface 192. Spring shell 220 is a hollow cylindrical shell type body being open at both ends and having a round circular washer-like head 222 attached to the thin cylindrical shell which makes up the remainder of spring shell 220, as shown in FIG. 4. Snap ring 190 pushes circular head 222 of the spring shell 220 against the wall cut in valve body 180 which defines the break between cylindrical surface 186 and cylindrical interior surface 192.

Still referring to FIG. 1, interior to spring shell 220 is clapper spring 230 which acts in compression having one end abutting the interior portion of round washer-like circular head 222 and the other end pushing against the outside peripheral edge of clapper 240. Clapper 240 comprises a cylindrical shell 242 (see also FIG. 5) having one end of the cylindrical shell completely open and the other end abutting a flat circular surface 244. Cylindrical shell 242 is sized such that its exterior surface slides within the interior of spring shell 220. Flat circular surface 244 has a diameter greater than spring shell 220 and thus limits the travel of cylindrical shell 242 within the interior of spring shell 220. Spaced around the cylindrical shell 242 are a plurality of drilled air passage openings 246. These openings permit the flow of air through the safety valve body 180. Attached to the side of flat circular surface 244 opposite cylindrical shell 242 is clapper guide pin 248. Clapper guide pin 248 extends from the center of flat circular surface 244 a distance of about one and a half times the length of cylindrical shell 242. Clapper guide pin 248 passes through the center opening of valve guide 250. It is noted that the area of the air passageways 246 exceeds the cross-sectional area of the interior of cylindrical shell 242. Continuing in this way, air passageways 246 are not a limiting factor in air flow.

Valve guide 250 shown in FIG. 1 (see also FIG. 6 and 6A) comprises a flat triangular shaped surface 252 which abuts flat circular surface 244 of clapper 240, and has an opening 254 through said triangular shaped flat surface 252 to accommodate clapper pin 248. Rising at right angles with the corners of the triangle are supports 256 which join to guide ring 258. Guide ring 258 then rests against the wall 195 which defines one end of cylindrical interior surface 196 of safety valve body 180. The partial groove in body 180 formed in part by wall 195 is sized to accommodate guide ring 258. As can be seen from FIG. 1, spring shell 220 is held in place by snap ring 190, clapper spring 230 in turn being held by shell spring 220 and pressing against the periphery of cylindrical shell 242 of clapper 240. Flat circular surface 244 of clapper 240 presses against the base or triangular shaped flat surface 252 of guide 250, which guide is finally restrained by guide ring 258 pressing against wall 195 of safety valve body 180.

The cross sectional view of the inventive quick disconnect coupler shows in FIG. 1 the coupler as it would be when not being used but being in its quiescent state, it also representing the state when in a compressed air system, but no air line attached by a male plug. At this time, no air could flow through the invention by virtue of the fact that air valve 202 is covering the opening of rubber washer 200 by the urging of valve spring 212. However, compressed air coming from a compressed air source connected to the end of safety valve body 180 would pass through the interstices between the supports 256 of guide 250, through the plurality of air passage openings 246, and through the opening of shell spring 220 defined by circular head 222 and snap ring 190. It is noted that in addition to valve spring 212 urging air valve 202 against rubber washer 200, there is the additional urging against the surface of air valve 202 by the compressed air source attached to valve body 180, thus doubly insuring that compressed air will not escape the inventive quick disconnect coupler until a male air line plug is inserted in the cavity of main body 120 to push back air valve 202.

A majority of the parts of the invention are machined from brass stock. Exceptions, however, in the preferred embodiment are the release pin 141 which is stainless steel, clamping ball 144 which is stainless steel, holding pin 151 which also is stainless steel. Snap ring 115 is brass and compression spring 116 is normally stainless steel. Rubber washer 200 is self-explanatory, and air valve 202 is normally stainless steel. Valve spring 212 is stainless steel as is clapper spring 230. It is realized that in many types of materials that have sufficient hardness and strength and/or spring qualities may be substituted for the types of material which were utilized in the preferred embodiment. For example, the entire assembly could be steel with the exception of rubber washer 200.

In normal usage, the compressed air source is attached to threaded portion 184 at the rear of valve body 180 applying compressed air. A male type plug attached to an air line, which in turn attaches to an air tool utilizing compressed air, then is inserted in the central portion cavity of main body 120.

The male plug is inserted in the connector main body 120 cavity without pulling sleeve 100 to the rear by merely pushing the plug into the cavity. Ridges on the standard male plug engage clamping balls 144 causing them to rise in passageway 146 and engage sloping wall 105 and snap ring 115 and thus pushing sleeve 100 to the rear. When sleeve 100 is pushed to the rear, its surface 103 rides over head 155 of holding pin 151, preventing pin 151 from retracting from the interior of main body cavity. Also note that the cleat which is staked at the top edge of the hole receiving pin head 155 restrains holding pin 151 at the shoulder 152 of pin head 155, in the case where the holding pin retracts, such as when a male plug pushes the pin shank away from the cavity. The pin shanks 154 does clear the male plug. See FIGS. 2 and 2A for an exaggerated view of pin 151. When the plug of the air line is inserted in the cavity of main body 120, it causes the holding pin 151 to rise slightly but not so far as to be compressed against the cleat staked in sleeve 100. The holding pin head 155 is beveled at its periphery such that surface 103 may slide easily over the pin head 155.

The male plug, then, as it protrudes further into the cavity of main body 120, finally engages prongs 204 of air valve 202, pushing air valve 202 to the rear and permitting air to move around the edges of flat circular surface 206, between prongs 204, and through the central opening of rubber washer 200 and into the hollow center of the air tool male plug. It is noted that the male plug fits closely within cylindrical surface 123 and, when fully engaged, does press firmly against rubber washer 200 and will move the central portion of rubber washer 200 to the rear by a slight distance (see also FIG. 9).

Thus, by virtue of the male plug engaging rubber washer 200 a complete air-tight fitting between valve body 180 and the male plug is provided. It is noted that only when the male plug is almost at its full depth inside main body 120 cavity does it begin to engage air valve 202 prongs 204 and thus permit compressed air to flow around air valve 202. Also, that the air valve 202 is moved back gradually permitting only a small amount of air to flow at the beginning around circular surface 206 and permitting more air to flow only as male plug goes more fully into its final resting position.

Shown in FIG. 2 and FIG. 2A is holding pin 151 comprising flat head 155, and cylindrical rod like shank portion 154. The end of the shank portion 154 is beveled as is the top edge of head 155, which bevel reaches to shoulder 152 formed in head 155. Holding pin 151 is formed from a single piece of metal, normally steel.

FIG. 3 illustrates air valve 202 in a perspective view showing mound 208 rising from the flat circular surface 206, groove means 210 cut into the mound 208 adjacent to the flat surface 206, and prongs 204 extending from the opposite side of surface 206. FIG. 3A shows a bottom view of air valve 202 illustrating the construction of prongs 204 extending perpendicular to the bottom of flat circular surface 206, and mound 208 shown dotted on the opposite side of air valve 202.

FIG. 4 shows spring shell 220 comprising thin cylindrical shell 221 having openings at both ends with round circular washer-like head 222 attached at one end. As seen in FIG. 4, both ends of spring shell 220 have openings to permit the passage of air.

FIG. 5 is a perspective view of clapper 240 which slides within spring shell 220. As can be seen in FIG. 5, clapper 240 comprises a cylindrical shell 242 which extends from a flat circular surface 244, which cylindrical shell has a plurality of air passage openings 246 drilled through its sides. Extending from flat circular surface 244 on the side opposite cylindrical shell 242 is clapper pin 248 which serves to align guide 250 discussed below. As discussed above, cylindrical shell 242 slides within thin cylindrical shell 221 of spring shell 220, the clapper shell entering the end of spring shell 220 opposite the end having head 222. In operation, compressed air circulates around flat circular surface 244 and enters air passageway openings 246 into the inner part of spring shell 220. In its normal configuration in use, openings 246 are completely exposed and not covered by spring shell 220.

Figure 6:
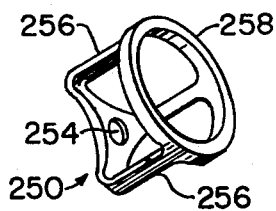
FIG. 6 is a perspective view of the guide.

FIG. 6 is a perspective view of guide 250 comprising its triangular shaped flat surface base 252, the supports 256 which rise from the corners of the triangle and the guide ring 258 which is joined to supports 256 at at least three points. It is realized of course that the base need not be triangular as it is only necessary that there be openings between the support 256, the guide ring 258 and the base 252 to allow passage of air. As mentioned earlier, base 252 rests against flat circular surface 244 of clapper 240 with clapper pin 248 penetrating opening 254 of guide 250.

Figure 6A:
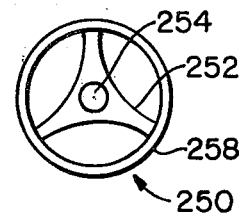
FIG. 6A is a top view of the guide.

FIG. 6A is a top view of guide 250 showing the topmost guide ring 258, the base 252, and the opening 254 through the center of the base.

Figure 7:
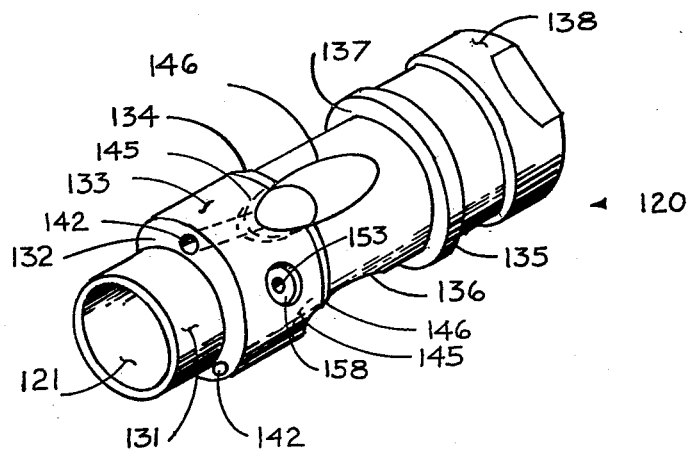
FIG. 7 is a perspective view of the main body.

FIG. 7 is a perspective view of main body 120 removed from the interior of sleeve 100. Shown in FIG. 7 is the entrance interior smooth cylindrical surface 121 and the outer cylindrical annular surfaces 131, wall 132 rising to join cylindrical surface 133, then sloping wall 134 dropping down from surface 133 to smooth cylindrical external surface 136 which, as you perceive from the front of main body 120 to the rear, terminates in perpendicular wall 137, which wall rises to its highest point, namely, smooth cylindrical external alignment surface 135. Thereafter, the remainder of the main body 120 continues to the rear with the end cylindrical smooth shank portion 138.

Shown in FIG. 7 is that part of construction necessary to the main body to receive those pieces and elements which work within main body 120 as follows. Passageway 142 is shown as drill holes in wall 132, said passageways receiving the release pins (not shown), and which extend to the rear (dotted lines) to meet passage ways 146 which receives clamping ball 144 (not shown). Also shown in FIG. 7 by dotted lines is the break 145 in passage way 146 formed by the drill bit in drilling passageways 146 which, together with the sides of passageway 146, restrain the clamping ball (not shown) from falling into the interior cavity. These restraining sides mentioned above are the sides which are at 90° to the longitudinal axis of main body 120. Also shown in FIG. 7 is the hole 158 machined into cylindrical surface 133 which receives the head of the holding pin 151 (not shown) and which sides are staked to retain pin 151. Shown also in the passageway 153 which accepts the shank of the holding pin.

The main body 120 and sleeve 100 are assembled together by first assembling all of the parts upon main body 120 namely, placing the clamping balls in their respective passageways, the holding pins in their passageways (and staking their head receiving holes), the release pins in their passage ways, and then placing compression spring 116 (not shown) about external surface 136 and slipping snap ring 115 (not shown) against compression spring 116. In assembly, snap ring 115 which is not a complete ring, but has a broken side, is compressed and squeezed against surface 136 permitting interior surface 108 of sleeve 100 to pass over it when main body 120 is inserted from the right hand side of sleeve 100. When main body 120 has reached its farthest position in sleeve 100, snap ring 115 expands into annular grooe 107 and stays there.

As can be seen from FIG. 1, once the sleeve and main body are assembled, it is very difficult to disassemble them because snap ring 115 prevents main body 120 to retract backwards because of smooth cylindrical external surface 133 is greater than the minimum diameter of snap ring 115 when snap ring 115 is in annular groove 107.

Assembly of the safety check valve is very simple. The spring shell 220, its enclosed clapper spring 230, clapper 240, and valve guide 250 are assembled in a linear fashion and inserted in the check valve body 180 largest interior diameter. They are pushed to their farthest position with spring shell 220 resting against the wall that forms part of interior surface 192. Then, snap ring 190, which is broken on one side, is inserted into groove 188.

Normally, air valve 202 having its associated valve spring 212 attached thereto is pushed into the center aperture of washer 200 after washer 200 has been inserted into main body 180 interior surface 124. Thereafter, safety check valve 180 is screwed into the mating threads 125 of main body 120 until the shank 182 engages the rubber washer 200 compressing it into an air tight configuration.

Figure 8:
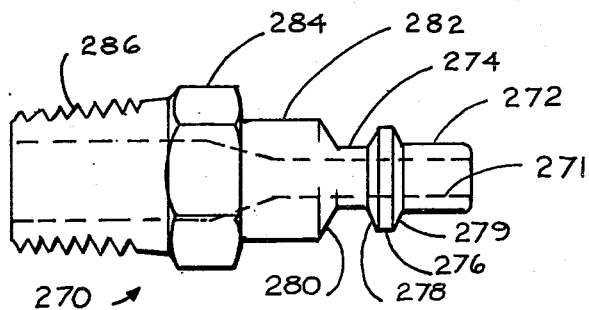
FIG. 8 is a side view of an associated male plug.

FIG. 8 is a side view of a standard male plug 270 which is received into the cavity of main body 120. Basically male plug 270 is cylindrical in shape, having an air passageway through its axial center with no obstructions. This air passageway 271 is shown by dotted lines in FIG. 8. Beginning now at the right-hand side of FIG. 8 and working left, male plug 270 has two cylindrical surfaces 272 and 274, separated by a ridge 276 which rises between the two surfaces and whose sloping walls 278 and 279 are at an angle of 45° from the cylindrical surfaces 274 and 272. Thereafter, cylindrical surface 274 terminates at sloping wall 280 whose slope is 45° which rises to meet cylindrical surface 282, whose diameter is slightly greater than the diameter of ridge 276. All cylindrical surfaces discussed above are smooth. Surface 272 is normally about ten-one-thousands greater diameter than surface 274. Thereafter, cylindrical surface 282 terminates in the normally hexagon shaped section 284, the hexagon shaped exterior surface adapted to receive a wrench to facilitate hooking an air hose to the remaining threaded portion 286 of male plug 270. An air hose connector may be attached to threaded portion 286 and thereafter to an air tool or, male plug 270 threaded portion may be mated into the air tool air tool air inlet with only the plug portion sticking out.

FIG. 9 is a cross sectional view of the inventive quick disconnect coupler with plug 270 in place in the connector in locked configuration. The most obviously noticable changes are that clamping ball 144 has risen slightly in its position in passageway 146, and that air valve 202 prongs 204 have been pushed back, and that rubber washer 200 is slightly deformed due to the end of the plug 270. Clamping ball 144 noticably rests on plug 270 cylindrical surface 274 and the side walls 280 and 278. Compressed air easily works its way around air valve 202 flat circular surface 206, through the center opening in rubber washer 200, and into the hollow interior 271 of plug 270 and thereafter to a connecting air line (not shown).

When plug 270 is first inserted into the cavity of main body 120, formed sloping wall 279 engages clamping ball 144 pushing it upward in passageway 146 to engage snap ring 115 and forcing sleeve 100 to the rear until ridge 276 of plug 270 clears clamping ball 144. At that time, clamping ball 144 then rides down sloping wall 278 (pushed by snap ring 115 and compression spring 116), and when ball 144 has reached at or near the bottom of surface 274, sleeve 100 has gone back to its farthest forward position.

Note that plug 270 may not be withdrawn from main body 120 without first sliding sleeve 100 to the rear. If an attempt is made to pull plug 270 out of locked position of main body 120, sloping wall 278 engages clamping ball 144 which in turn engages the upper portion of sloping passageway 146. In the preferred embodiment, sloping wall 278 is at a 45° angle to the longitudinal axis while sloping passageway 246 is at a 37° angle to the longitudinal axis. Thus, slope 278 pushing against clamping ball 144 when trying to remove the male plug causes ball 144 to roll against the upper surface of passageway 146 into an ever decreasing space in a wedging type action, resulting in a positive type clamping of male plug 270. The angle of sloping wall 146 being 37° and the sloping wall angle of 278 being 45°, if the walls were extended, form an angle of 8° into which ball 144 is urged to provide the positive wedge.

To remove plug 270 from the interior cavity of main body 120, it is necessary that sleeve 100 be pulled to the rear, against the urging of compression spring 116. When this is done, sleeve 100 annular washer-like surface 102 engages release pin 141 which in turn strikes clamping ball 144, now near its center, pushing clamping ball to the rear, off male plug sloping wall 278 and into passageway 146 of main body 120. When sleeve 100 has been pulled to its maximum rear position, ball 144 has risen sufficiently high to permit ridge 276 of male plug 270 to pass under it. Please note that when sleeve 100 is drawn to the back that clamping ball 144 rises to enter annular groove 104 which now is in position over passageway 146 to receive a sufficient portion of clamping ball 144 to permit male plug 270 to be withdrawn.

Another feature of the inventive quick disconnect coupler and safety check valve is that the invention provides means to discharge the compressed air that is in the air line attached to plug 270 when plug 270 is withdrawn without permitting plug 270 to shoot out of the couplers as is presently common. In couplers that are presently available, when their counterpart of sleeve 100 is withdrawn to the rear, male plug 270 comes shooting out and is a source of potential harm. In the invention, herein described, as sleeve 100 is pulled rearward to release plug 270, sleeve 100 interior annular surface 103 slides over the top of the head of holding pin 151 preventing the pin from retracting from the interior of main body 120. Plug 270 then may come out of main body 120 until its sloping wall 278 engages the side of holding pin 151 at which time plug 270 may proceed no further. At this time, then, air valve 202 has come fully against rubber washer 200 shutting off the source of compressed air and the compressed air in the air line leading to the air tool then forces its way out the front end of the coupler. Only when sleeve 100 is permitted to go back to its forward position, surface 103 no longer riding on the top head of pin 151, will holding pins 151 retract from the interior of main body 120, past ridge 276 and permit male plug 270 to be completely withdrawn.

It is noted that clamping ball 144 is free of ridge 276 only when sleeve 100 is nearly all the way to its rearward position and that surface 103 clears holding pin 151 only when sleeve 100 is nearly at its forwardmost point position. This prevents the situation where clamping ball 144 has risen sufficiently high to permit ridge 278 to pass under it while surface 103 has not yet engaged holding pin 151 head.

Concerning the operation of the safety check valve 180, the valve operates such as to shut off the flow of air whenever the air flow rate exceeds a specified amount, an amount which is determined by the construction of the valve. As noted above, the air flowing through the safety check valve flows through air passageways openings 246 of clapper 240 (FIG. 1) and that the area of passageways 246 exceeds the area of the interior of cylindrical shell 242 (see also FIG. 5). The rate at which the clapper will close, i.e., move against spring shell 220 is when a certain specified air flow rate is exceeded. This would be such as in the case of the air line connected to plug 270 or severed. This is a dangerous situation as the end of the severed hose attached to the air source goes flying around and will strike objects with considerable force. The determining factors which close clapper 240 is the size of the interior hole of the cylindrical shell 242 of clapper 240 and the clapper spring 230 which resides in the spring shell 220. For example, in a standard 110 to 120 psi compressed air system, for a 7½ oz., ⅜-inch spring, a ¼-inch clapper interior hole will shut off at 10 cubic feet per minute air flow. Then, with a ⅜-inch diameter hole in the interior of clapper cylindrical shell 242, the air safety check valve will close at 15 cubic feet per minute air flow. Also, for a ½-inch hole, the safety check valve will shut off at 27 cubic feet per minute air flow. References to the spring above means that the spring exerts 7½ oz. of pressure when it is compressed to ⅜ inch.

Obviously, clapper 240 operates on differential pressure between the compressed air side of its flat circular surface 244 and the reduced air pressure within its cylindrical shell 242, on the opposite side of flat circular surface 244. As a general rule, air tools do not use compressed air near or at the rate which air would escape into the environment as would be the case for a severed air line.

While in the preferred embodiment, the air seal created by clapper 240 being in its position having a flat circular surface 244 pushed against spring shell 220 is not perfectly air tight, as a practical matter, the air flow is very slight out the end of the severed air line and is not sufficient to permit the air line to swing or move as it does with full air flow.

While a preferred embodiment has been described, it is intended to cover all modifications and alternate constructions falling within the spirit and the scope of the invention as defined in the appended claims. For example, although the invention speaks of air flow through a compressed air system, it is obvious that the invention has application to fluids of all types including water, petroleum, and other fluids and liquids.

I claim:

1. In a compressed air system in-line quick disconnect female coupler adapted to receive an associated cylindrical male plug having a truncated cone cross-sectional shaped annular ring formed thereon and an annular groove formed therein, said annular ring defining in part said annular groove an improvement comprising cylindrical body means having at least one each angled first passageway through the cylindrical wall thereof; retractable sleeve means exteriorly coaxial said cylindrical body means, said sleeve means defining a first interior annular groove means juxtaposed said first passageway in said cylindrical body means, annular split ring means nesting in said first annular groove means, compression spring means interior said sleeve means juxtaposed said annular split ring means and said cylindrical body means outside surface, and second interior annular groove means adjacent said first interior annular groove means; holding ball means residing in said cylindrical body means first passageway communicating with both said cylindrical body means interior and exterior; and full flow valve means interiorly said cylindrical body means whereby when inserting said associated male plug means into said female coupler, said holding ball means is engaged by the associated male plug means annular ring, said holding ball rises in said first passageway, engages said sleeve means split ring means and wall of said second interior annular groove means, and retracts said sleeve means thereby permitting continued movement of said holding ball means in order to ride up said associated male plug annular ring into said sleeve means second interior annular groove which has moved over said cylindrical body first passageway, over said associated male plug annular ring and down into said associated male plug annular groove means, said spring means then urging said sleeve means to its initial position and the associated male plug is held in place by coaction of said holding ball means, said associated male plug annular groove means, and said sleeve means, and said cylindrical body means thereby engaging said full flow valve means permits air to flow through said coupler.

2. The improvement in a quick disconnect female coupler as defined in claim 1 wherein the angle formed by the longitudinal axis of the cylindrical body means and the cylindrical body means first passageway is less than the angle of the annular ring sloping wall forming the exterior annular groove of the associated cylindrical male plug and its longitudinal axis thereby clamping the holding ball means into two narrowing surfaces when attempts are made to withdraw the associated male plug.

3. The improvement in a quick disconnect female coupler as defined in claim 1 wherein the angle between the longitudinal axis of the cylindrical body means and the cylindrical body means first passageway is 37°.

4. The improvement in a quick disconnect female coupler as defined in claim 1 wherein said cylindrical body means comprises at least one each second passageway through said cylindrical wall, and release pin means residing in said second passageway communicating between said sleeve means and said holding ball means whereby when said sleeve means is retracted, said release pin is engaged by said sleeve means and thereby engages said holding ball raising said ball up in said first angled passageway and into the second interior annular groove means in said sleeve means thereby removing said holding ball from its holding position within the associated male plug annular groove and allowing said associated plug means to be withdrawn from said coupler.

5. The improvement in a quick disconnect female coupler as defined in claim 4 wherein the angle between the second passageway and the cylindrical body longitudinal axis is 8°.

6. The improvement in a quick disconnect female coupler as defined in claim 5 wherein the angle formed between the first and second passageway in said cylindrical body means is greater than 90°.

7. The improvement in a quick disconnect female coupler as defined in claim 6 wherein the angle between the first and second passageway in the said cylindrical body means is 135°.

8. The improvement in a quick disconnect female coupler as defined in claim 4 wherein said cylindrical body means comprises at least one each third passageway through the cylindrical wall thereof, and holding pin means residing in said third passageway, said holding pin means communicating with said cylindrical body means interior and said cylindrical body means exterior surface whereby said sleeve means slides over and engages said pin means when said sleeve means is retracted, said holding pin means communicating with said cylindrical body means interior engaging said associated male plug annular ring when withdrawing said associated male plug, and thereby preventing the full withdrawal of the associated male plug until the sleeve means returns to its original position.

9. The improvement in a quick disconnect female coupler as defined in claim 8 wherein each said first, second, and third passageways comprise at least three each passageways.

10. The improvement in a quick disconnect female coupler as defined in claim 8 wherein said full flow valve means comprises saddle shaped valve means and flexible material washer means, said saddle shaped valve means outward extending prongs attached to flat surface sealing means covering said opening in said flexible material washer means, said prong means extending through said washer means opening, and spring means urging said flat surface sealing means against said flexible material means whereby said associated male plug engages said prong means upon insertion and separates said flexible washer means and said flat surface sealing means in order that air may pass between said flat surface sealing means and said flexible material washer means through the orfice of said flexible material washer means into the associated male plug means.

* * * * *